(12) United States Patent
Garg et al.

(10) Patent No.: US 10,009,306 B2
(45) Date of Patent: Jun. 26, 2018

(54) METHODS TO MITIGATE COMMUNICATION DELAYS BETWEEN SYSTEMS IN CONNECTION WITH A TRANSPORT SERVICE

(71) Applicant: Uber Technologies, Inc., San Francisco, CA (US)

(72) Inventors: Sunil Kumar Garg, San Francisco, CA (US); Abhay Vardhan, Redwood City, CA (US)

(73) Assignee: Uber Technologies, Inc., San Francisco, CA (US)

( * ) Notice: Subject to any disclaimer, the term of this patent is extended or adjusted under 35 U.S.C. 154(b) by 250 days.

(21) Appl. No.: 14/714,077

(22) Filed: May 15, 2015

(65) Prior Publication Data

US 2016/0337294 A1    Nov. 17, 2016

(51) Int. Cl.
*G07B 13/00* (2006.01)
*H04L 12/58* (2006.01)
(Continued)

(52) U.S. Cl.
CPC ............. *H04L 51/18* (2013.01); *G06Q 10/08* (2013.01); *G06Q 30/0284* (2013.01);
(Continued)

(58) Field of Classification Search
CPC .... G01C 22/00; G06Q 30/0284; G07B 13/00; G07B 13/04
See application file for complete search history.

(56) References Cited

U.S. PATENT DOCUMENTS 8,583,319 B2    11/2013   Scott
2003/0194991 A1*  10/2003   Gilmour ................. H04L 29/06
                                                  455/414.1
(Continued)

FOREIGN PATENT DOCUMENTS

JP          2014-075727        4/2014
KR      10-2009-0016782        2/2009
(Continued)

OTHER PUBLICATIONS

ISR and Written Opinion dated Aug. 8, 2016 in PCT/US2016/032558.
(Continued)

*Primary Examiner* — Jeong S Park
(74) *Attorney, Agent, or Firm* — Mahamedi IP Law LLP

(57) ABSTRACT

A system operating on a computing device can determine a set of location data points of the computing device during progress of a transport service, and can transmit the set of location data points to a network service. The system can transmit, to the network service, a message indicating that the transport service has been completed. The system determines whether a predetermined duration of time has elapsed since transmitting the message indicating that the transport service has been completed, during which a predefined message has not been received by the application from the network service. The predefined message is associated with a confirmation that the transport service has been processed by the network service. If the predetermined duration of time has elapsed during which the predefined message has not been received, the system displays first content as opposed to second content on the computing device.

12 Claims, 6 Drawing Sheets

(51) Int. Cl.
*H04L 29/08* (2006.01)
*G06Q 30/02* (2012.01)
*G06Q 10/08* (2012.01)
*G08G 1/00* (2006.01)

(52) U.S. Cl.
CPC ............ *G07B 13/00* (2013.01); *G08G 1/202* (2013.01); *H04L 67/12* (2013.01); *H04L 67/18* (2013.01)

(56) References Cited

U.S. PATENT DOCUMENTS

| | | | |
|---|---|---|---|
| 2004/0106399 A1* | 6/2004 | Ki | G06Q 30/0283 455/422.1 |
| 2008/0270204 A1* | 10/2008 | Poykko | G06Q 10/04 705/7.29 |
| 2011/0059693 A1 | 3/2011 | O'Sullivan | |
| 2011/0099040 A1 | 4/2011 | Felt et al. | |
| 2012/0203599 A1 | 8/2012 | Choi et al. | |
| 2012/0225671 A1 | 9/2012 | Lubeck et al. | |
| 2013/0073327 A1 | 3/2013 | Edelberg | |
| 2013/0246132 A1 | 9/2013 | Buie | |
| 2014/0058896 A1 | 2/2014 | Jung | |
| 2014/0067488 A1 | 3/2014 | James et al. | |
| 2014/0067491 A1* | 3/2014 | James | G06Q 50/30 705/13 |
| 2014/0129302 A1 | 5/2014 | Amin et al. | |
| 2014/0129951 A1* | 5/2014 | Amin | G06O 50/30 715/738 |
| 2014/0207538 A1 | 7/2014 | Jin et al. | |
| 2014/0278616 A1* | 9/2014 | Stone | G06Q 10/025 705/6 |
| 2014/0278838 A1 | 9/2014 | Novak | |
| 2015/0012341 A1 | 1/2015 | Amin | |
| 2015/0032485 A1 | 1/2015 | Nelson | |
| 2015/0254581 A1* | 9/2015 | Brahme | G06Q 10/02 705/5 |

FOREIGN PATENT DOCUMENTS

| | | |
|---|---|---|
| KR | 10-2009-0093408 | 9/2009 |
| KR | 10-2011-0024979 | 3/2011 |
| WO | WO 2007-050604 | 5/2007 |
| WO | WO 2014-036330 | 3/2014 |
| WO | WO 2014-074407 | 5/2014 |

OTHER PUBLICATIONS

International Search Report/Written Opinion in related PCT/US2015/033801 dated Oct. 19, 2015.

ISR and Written Opinion dated Jul. 13, 2016 in PCT/US2016/027388.

International Search Report and Written Opinion in PCT/US2016/025508 dated Jun. 29, 2016.

\* cited by examiner

METHODS TO MITIGATE COMMUNICATION DELAYS BETWEEN SYSTEMS IN CONNECTION WITH A TRANSPORT SERVICE

BACKGROUND

Communications between devices may be affected based on a variety of factors. For example, a network outage or network interference can result in a device having low signal quality, or a device may have bandwidth issues due to a high utilization of computing resources. Such factors can cause a device to not receive a communication from the other device or can cause a delay in the communication transmission.

DETAILED DESCRIPTION

Figure 1:
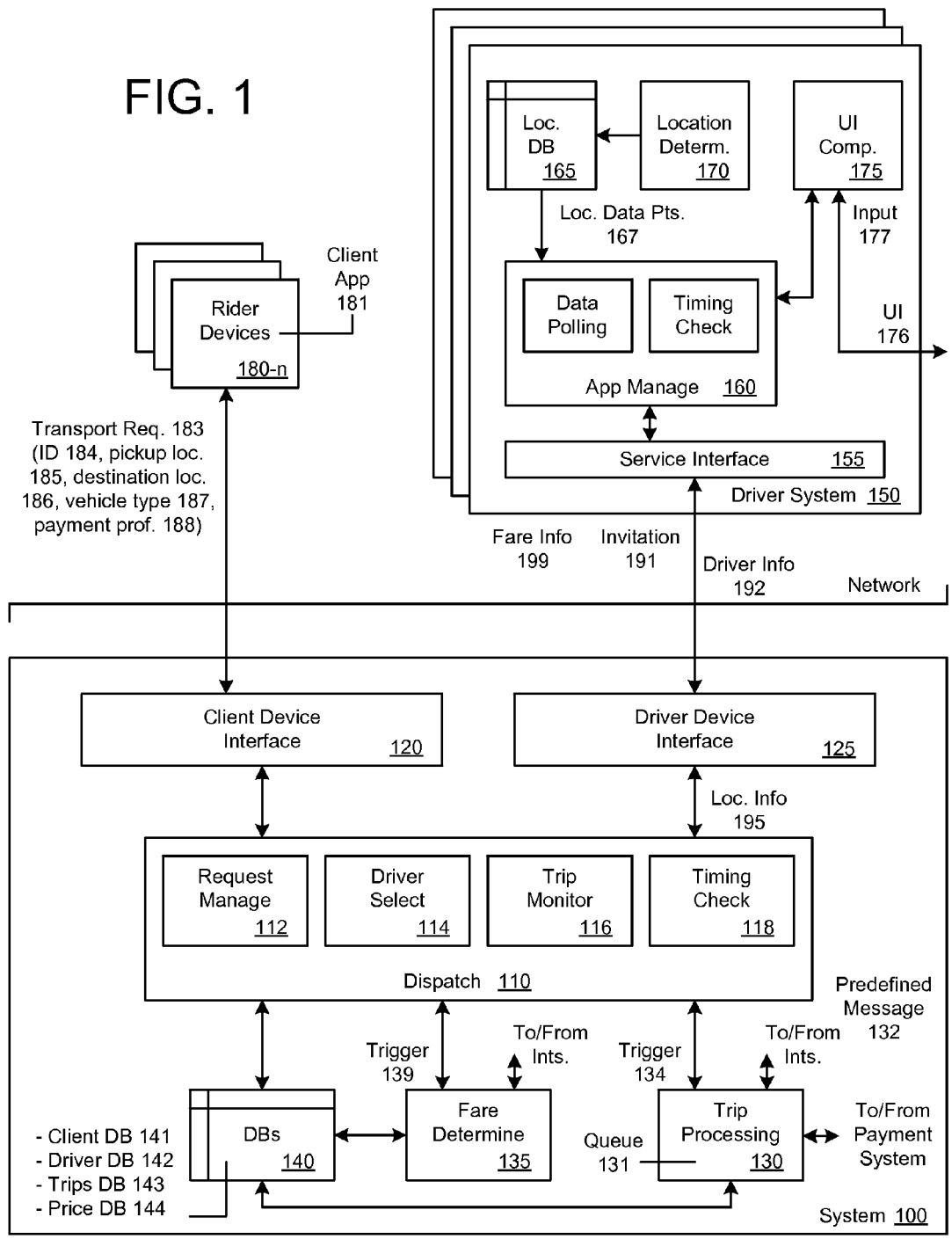
FIG. 1 illustrates example systems to mitigate communication delays between systems, under an embodiment.

According to examples described herein, a network service can communicate with computing devices for purposes of arranging transport services to be provided by service providers of those computing devices. Such a computing device can operate a designated service application that exchanges communications with the network service, such as information about a transport service that a driver is to provide or driver/application data. In some instances, data that is to be received by the computing device, e.g., the driver device, may not actually be received for a long period of time, if at all, as a result of various issues. For example, the network service may have a backlog of other transport services to process, or one or more system components may be subject to downtime (e.g., API downtime). Moreover, poor mobile connectivity may also exacerbate the delay (e.g., network outage or network interference). Such delays in communication may cause the driver of the computing device to have to wait and waste valuable time before being able to receive another assignment for providing another transport service.

Systems and methods are described herein that mitigate the result of communication delays between computing devices and a network service. Depending on implementation, a backend system implementing the network service or a driver system operating on a computing device can individually, or in combination, programmatically perform substitute data processing operations as opposed to default data processing operations in the event that a specified communication is not transmitted by the backend system or received by the driver system during a certain amount of time.

For example, for each transport service that is completed by a driver, the network service can determine a value or a score associated with that transport service. The value or score can be based on parameters that include distance traveled and/or time of travel, as well as other factors or parameters. In some examples, the value or score can correspond to or be equated to a monetary value (e.g., a fare amount) that is based on one or more parameters, including current price parameters, discount parameters and/or credit parameters. In various instances, it may be necessary for information about the determined value to be known by a rider and/or a driver immediately or very quickly after completion of the transport service. For example, in instances where transport services are paid for in cash (as opposed to a stored credit card or online financial account associated with the rider's account or profile with the network service), rider and/or drivers must know how much to pay and/or collect, respectively, immediately upon ending the transport service. Delays in the fare amount being received in a timely fashion by the driver system may result in both the rider and/or the driver having to wait a substantial amount of time.

According to some examples, when the backend system receives an indication that a transport service has been completed, it can initiate a processing operation, e.g., a default or primary operation, to process the data associated with the completed transport service. The processing operation can include, for example, a plurality of sub-operations, such as a data aggregation operation in which data associated with the completed transport service is compiled, a data storage operation in which the data is stored in a persistent memory resource (e.g., writing the data to disk), a fraud detection operation to analyze the data to determine whether or not the rider and/or the driver was fraudulent, a payment processing operation to enable funds to be withdrawn from and/or deposited to the correct financial accounts of the rider and/or the driver, respectively, and/or a fare calculation operation to compute the fare for the completed transport service, etc. When the backend system completes the processing operation, in one example, it can transmit a predefined message to the driver system. Such a predefined message can be associated with a confirmation that the transport service has been processed by the network service. To mitigate any potential delays that may occur in completing the processing operation and/or in communicating the predefined message to the driver system, however, in some examples, the backend system can concurrently (and/or independent of the processing operation) initiate a fare determination operation to compute the fare amount for the transport service. The backend system can also make a determination whether completing the processing operation and/or transmitting the predefined message will take longer than a predetermined duration of time. If so, the backend system transmits information corresponding to the fare amount to the driver system, while continuing to perform the processing operation.

In other examples, the driver system can perform substitute data processing operations to mitigate any potential delays in communication with the network service. For example, when a driver operating the driver system (on the driver device) provides input indicating that the transport service is completed, the driver system can transmit a message representing completion of the transport service to the network service. The driver system can determine whether a predetermined duration of time has elapsed since transmitting the message, during which a predefined message has not been received by the driver system from the network service. Based on this determination, the driver system can either process the predefined message to determine first data used for displaying content on the computing device, or alternatively, determine second data (e.g., from performing a substitute processing operation) for displaying alternative content on the computing device.

Among other benefits, some examples described herein recognize that data processing backlogs, system outages, and/or network connectivity issues pose challenge to efficiently communicate data between devices or systems. Among benefits and technical effects achieved with examples as described, a network service system and/or a mobile computing system can perform substitute or supplemental data processing operations (in addition to or in replacement of default operations) to prepare for any potential communications issues that may arise between the network service system and the mobile computing system.

As used herein, a user device, a rider device, a client device, a driver device, a computing device, and/or a mobile device refer to devices corresponding to desktop computers, cellular devices or smartphones, personal digital assistants (PDAs), laptop computers, tablet devices, etc., that can provide network connectivity and processing resources for communicating with a network service over one or more networks. Rider devices and driver devices can each operate a designated service application (e.g., a client application and a driver application, respectively) that is configured to communicate with the network service (e.g., a server or computing system that implements the network service). A driver device can also correspond to a computing device or custom hardware that is installed in or incorporated with a vehicle, such as part of the vehicle's on-board computing system.

Still further, examples described herein relate to a variety of services, such as a transport service, a food truck service, a delivery service, an entertainment service, a house cleaning service, etc., or generally, any on-demand service or any variable-priced service and/or post-paid transaction between a user and a service provider or provider of goods. Although examples described herein refer to a rider that requests a transport service for purpose of simplicity, in general, a rider can refer to an individual operating a device that makes a request for a location-based service, such as described above. In some examples, the network service can be implemented or operated by an entity that provides goods or services for purchase or arranges for goods or services to be purchased through the use of computing devices and network(s).

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples described herein can be carried and/or executed. In particular, the numerous machines shown with examples described herein include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

System Description

FIG. 1 illustrates example systems to mitigate communication delays between systems in connection with a transport service, under an embodiment. In one example, a service arrangement system 100 (also described herein as the backend system that implements the network service) includes a dispatch 110, a rider device interface 120, a driver device interface 125, a trip processing component 130, a value (or fare) determine 135, and a plurality of databases 140. The plurality of databases 140 can include, for example, a rider database 141, a driver database 142, a trips database 143, a price database 144, and other databases. The rider database 141 can store a plurality of rider profiles or accounts that are associated with riders and/or the rider devices 180 operated by those riders. Similarly, the driver database 142 can store a plurality of driver profiles or accounts that are associated with drivers and/or the driver devices operated by those drivers. The trips database 143 can store trip entries each corresponding to a transport service and can each be associated with a rider and/or a driver. The price database 144 can store parameters for determining a value or a score (e.g., a fare) of a transport service based on data associated with the transport service.

A plurality of rider devices 180 and a plurality of driver devices (each implementing a driver system 150) (e.g., service provider devices) can communicate with the system 100 over one or more networks using, for example, respective designated service applications that are configured to communicate with the system 100. For example, each rider device 180 can store and run a designated client application 181 that enables communications to be exchanged between that rider device 180 and the system 100. Each driver device can also store a designated driver application, which, depending on implementation, corresponds to, is a part of, or includes the driver system 150. As described herein, the components of the system 100 and/or the components of the driver system 150 can combine to perform operations to mitigate potential delays in communication between the system 100 and the driver system 150. Logic can be implemented with various applications (e.g., software) and/or with hardware of a computer system that implements each of the system 100 and the driver system 150. Because the components described in FIG. 1 are an illustrative example of the system 100, in some examples, one or more of the components of the system 100 (e.g., the trip processing 130, the fare determine 150, etc.) can be a part of the dispatch 110.

Depending on implementation, one or more components of the system 100 can be implemented on network side resources, such as on one or more servers. The system 100 can also be implemented through other computer systems in alternative architectures (e.g., peer-to-peer networks, etc.). As an addition or an alternative, some or all of the components of the system 100 can be implemented on rider or driver devices, such as through applications that operate on the rider devices 180 and/or the driver devices. For example, a driver application can execute to perform one or more of the processes described by the various components of the system 100. The system 100 can communicate over a network, via a network interface (e.g., wirelessly or using a wireline), to communicate with the one or more rider devices 180 and the one or more driver devices.

The system 100 can communicate, over one or more networks, with rider devices 180 and driver devices using a rider device interface 120 and a device interface 125, respectively. The device interfaces 120, 125 can each manage communications between the system 100 and the respective computing devices 180, 190. The rider devices 180 and the driver devices can individually operate client applications 181 and driver applications (or driver systems 150), respectively, that can interface with the device interfaces 120, 125 to communicate with the system 100. According to some examples, these applications can include or use an application programming interface (API), such as an externally facing API, to communicate data with the device interfaces 120, 125. The externally facing API can provide access to the system 100 via secure access channels over the network through any number of methods, such as web-based forms, programmatic access via RESTful APIs, Simple Object Access Protocol (SOAP), remote procedure call (RPC), scripting access, etc.

In some examples, the system 100 implements a network service that provides a platform to enable riders of rider devices 180 to request services, such as transport services, through use of respective client applications 181. The system 100 can receive a transport request from a rider device 180, process the transport request by selecting a driver to provide the transport service (also referred to herein as a "trip") for the requesting rider, and invite the selected driver to provide the trip. In the example of FIG. 1, a rider can provide input via the client application 181 to request a transport service to go from one location to another. The system 100 can receive a transport request 183 from the rider device 180 of that rider, via the rider device interface 120. In one example, the transport request 183 can include a user identifier (ID) 184, a pickup location data point 185 (or a pickup address), a destination location data point 186 (or a destination address), a vehicle type 187 (e.g., a category or class of vehicles that the rider wants to be transported in), and/or a payment profile 188 specified by the rider (e.g., how the rider wants to pay or what financial account the rider wants to pay with). Information, such as the pickup location data point 185 or the destination location data point 186, can be obtained using the global positioning system (GPS) receiver of the rider device 180 or be inputted on the rider device 180 or the driver device.

The dispatch 110 can process the transport request 183 for the rider. According to an example, the request manage component 112 receives the transport request 183 (or some or all of the information from the transport request 183) to determine the user-specified parameters for the transport request 183. The request manage component 112 can provide the service location information (e.g., the pickup and/or the destination location points 185, 186) and the vehicle type requested to the driver select component 114. The request manage component 112 can also create a trip entry for the requested transport service in the trips database 143 and associate the rider's ID 184 with the trip entry (or an identifier of the trip entry). The request manage component 112 can also access the rider's account in the rider database 141 to determine if the specified payment profile 188 is valid. For example, the rider may have multiple payment profiles for multiple credit cards associated with the rider's account, and can select one of them for payment of the transport service. If the rider, however, specified in the payment profile 188 that he or she will be paying with cash (as opposed to a stored payment method of the rider), the request manage 112 can associate the specified payment method with the trip entry of the transport service. The request manage 112 can also provide an indication to the timing check component 118 that this particular transport service requires information about the value of the transport service (e.g., the fare amount) within a predetermined duration of time after completion of the transport service (e.g., as the rider wants to pay with cash). While the timing check component 118 is illustrated in the example of FIG. 1 as being part of the dispatch 110, in other examples, the timing check component 118 can be a separate component of the system 100 that communicates with the dispatch 110, the interfaces 120, 125, the trip processing 130, and/or the fare determine 135.

The driver select component 114 of the dispatch 110 can select a driver for the rider based on the rider's specified transport parameters. Depending on implementation, the driver select component 114 can use a variety of factors to select a driver (having a vehicle of the requested vehicle type) for the rider, such as selecting the closest driver (based on shortest distance or shortest estimated travel time to the pickup location data point 185) or selecting a driver that will be traveling close to the pickup location data point 185 and/or the destination location data point 186. The driver select component 114 can access the driver database 142, which stores real-time or close to real-time driver information (e.g., such as the drivers' or driver devices' current locations and statuses) of those drivers that are within a specified region or distance of the pickup location data point 185.

According to examples, the dispatch 110 can periodically receive and store information about drivers' locations and statutes in the driver database 142 received from driver systems 150 via the driver device interface 125. For example, referring to the driver system 150 of a driver device, the driver system 150 can include a location determination 170 that periodically determines the current location of the driver device using the GPS receiver of that driver device, and can store, in a location database 165, the location data points 167 corresponding to the current location at individual instances in time. When the driver system 150 runs on the driver device (e.g., the driver launches the driver app) and the driver goes on duty (e.g., updates the driver's state or application state as being available to receive transport service invitations), the driver system 150 can periodically provide the location data points 167, via the service interface 155, to the system 100. In this manner, the system 100 can store data about where the drivers are and the status of the drivers (e.g., on-duty and available, off-duty, on trip and providing transport, etc.).

Based on the pickup location data point 185 (and/or the destination location data point 186), the vehicle type 187, and the driver information in the driver database 142, the driver select component 114 can select a driver to provide the transport service for the rider. The dispatch 110 can transmit, via the driver device interface 125, an invitation 191 to the selected driver system 150. The application manage 160 of the driver system 150 can cause the user interface (UI) component 175 to output a user interface 176 on the display of the driver device based on the invitation 191, which can include information about the transport service to be provided. The driver can provide input 177 on a user interface of the driver application to either accept the invitation 191 or reject the invitation 191 (e.g., by allowing the duration of time to accept the invitation 191 expire).

When the input 177 is received to accept the invitation 191, the application manage 160 can provide a message indicating that the transport service has been accepted to the dispatch 110. The application manage 160 can provide driver (or driver application) information 192, which can include the acceptance message as well as the location data point 167 of the driver device and/or the state of the driver or driver application (e.g., on route to the pickup location, on trip, etc.). The trip monitor component 116 of the dispatch 110 can receive information indicating the driver's acceptance and determine that the transport service has been arranged for the rider. The dispatch 110 can also provide information about the driver and that the transport service has been accepted to the rider device 180.

Once the trip is arranged for the rider, the trip monitor component 116 can monitor the status and progress/performance of the transport service, such as where the driver is relative to the pickup location, by receiving current driver location information 195 from the selected driver system 150 (e.g., periodically). As described herein, the current driver location information 195 can correspond to one or more of the location data points 167 determined by the location determination 170. The dispatch 110 can also provide the progress information to the rider device 180 so that the rider can see the movement and location of the driver.

When the driver reaches the pickup location and determines that the transport service can begin (e.g., the rider enters the vehicle or the driver picks up a package for delivery, etc.), the driver can provide input 177 by selecting a feature on the user interface 176 (e.g., "Begin Trip" soft button). The application manage 160 can transmit a message, as part of the driver info 192, that indicates that the transport service has begun. The trip monitor component 116 can receive the message and record, in the trip entry for the transport service, the start location of the transport service and the associated time when the transport service was initiated. The trip monitor component 116 can also update the trip entry and/or driver database 142 with the received driver location information 195 as the transport service progresses from the pickup location to the destination location. According to some examples, the trip entry can include trip information, such as the trip ID, the user ID 184, the rider device ID, the driver ID, the driver device ID, the vehicle type, the pickup location (e.g., start location), the time for pickup (e.g., the start time), the location data points corresponding to the travel of vehicle, etc.

When the driver reaches the destination for the rider, the driver can provide input to indicate that the transport service has been completed. In one example, the UI component 175 can display a user interface 176 while the application (or the driver) is in an on-trip state. Such a user interface 176 can also include a selectable feature than, when selected, ends the transport service by changing the application state to an available or on-duty state and causes the application manage 160 to transmit a message, as part of the driver information 120, indicating that the transport service has been completed. The trip monitor component 116 can receive the message and record, in the trip entry for the transport service, the end location of the transport service and the associated time when the transport service was completed.

In addition, in one example, when the system 100 receives the message indicating that the transport service has been completed (e.g., the "trip completed" message), the trip processing 130 can receive a trigger 134 (e.g., from the trip monitor component 116 in the example of FIG. 1, or alternatively, from the driver device interface 125) to initiate a default or primary processing operation for the transport service. In examples described herein, for each transport service that is completed, the system 100 can perform a plurality of processes for that transport service. The trip processing 130 can initiate the processing operation, which can include, for example, a plurality of sub-operations. Depending on implementation, the plurality of sub-operations can include one or more of: (i) a fraud detection operation to analyze data associated with the transport service to determine whether or not the rider and/or the driver was fraudulent, (ii) a fare calculation operation to compute the fare for the completed transport service, (iii) a payment processing operation to enable the appropriate funds to be withdrawn from and/or deposited to the correct financial accounts of the rider and/or the driver, respectively, by communicating with a payment system, (iv) an invoice or receipt creation operation for the transport service, including generating graphics corresponding to the route traveled, (v) a data aggregation operation in which data associated with the completed transport service is compiled, or (vi) a data storage operation in which the data associated with the completed transport service is stored in a persistent memory resource (e.g., writing the data to disk). The trip processing 130 can use data stored in the databases 140 to perform one or more of the sub-operations.

When the trip processing 130 completes the processing operation, it can transmit a predefined message 132 associated with the completed transport service to the respective driver system 150 via the driver device interface 125. According to one example, the predefined message 132 can also be transmitted to the client application 181 via the rider device interface 120. As described herein, a predefined message 132 can indicate or be associated with a confirmation that the transport service has been processed by the system 100. In some examples, the predefined message 132 can include data or information that is based on the result of one or more sub-operations. For example, the predefined message 132 can include information corresponding to fare of the transport service that is determined from the fare calculation operation. According to examples herein, because the processing operation includes a number of sub-operations that are to be completed, it may take the trip processing 130 a certain amount of time to complete the processing operation for the completed transport service (e.g., six seconds, ten seconds), provided that the system components are working properly (e.g., no downtime of modules or system crashes, etc.).

In some instances, even with the system components working properly, when multiple transport services are completed by drivers around a same time (e.g., ten trips are completed within five seconds of each other), it may take the trip processing 130 a much longer time to complete the processing operation for the completed transport service (e.g., sixty seconds, ninety seconds, etc.). In such examples, the trip processing 130 can use a queue 131 to determine an order to complete each processing operation for individual transport services that have completed. For example, for each of the ten "trip completed" messages the system 100 receives from ten driver systems, the trip processing 130 may have initiated the processing operation for each by adding data (e.g., the trip ID or the driver ID, etc.) for that transport service in the queue 131 (e.g., as a first-in, first-out queue).

For those transport services in which riders have elected to pay with a payment method associated with a financial account (e.g., a credit card or a debit card), a significant delay in the transmission of the predefined message 132 to the driver system 150 and/or the client application 181 of the rider is not a problem. The rider or the driver can review the fare or the trip receipt at a later time (e.g., two hours later), as the payment for the transport has already been resolved via the payment system. The driver system 150 that fails to receive the predefined message 132 may still continue to receive invitations for transport and provide transport for other riders.

However, if the transport service to be processed is to be paid for by the rider in cash, for example, as opposed to using information associated with a financial account, then the system 100 can perform mitigating operations as a precaution in the event that the predefined message 132 is not received in a timely manner. According to an example described herein, when the rider specifies that he or she wants to pay in cash (in the payment profile 188), the timing check component 118 can receive indication that information about the value of the transport service needs to be provided to the rider device 180 and/or the driver system 150 within a short, predetermined duration of time (e.g., ten seconds, fifteen seconds). Based on the user's specified payment method, the system 100 can perform, for that rider's transport service, an additional operation (in addition to the default processing operation). For example, when the system 100 receives the "trip completed" message, in addition to triggering the trip processing 130 to initiate the processing operation, the value (or fare) determine 135 can also receive a trigger 139 (e.g., from the trip monitor component 116 in the example of FIG. 1, or alternatively, from the driver device interface 125) to initiate a fare determination operation for the transport service.

According to examples, the fare determine 135 can initiate the fare determination operation which uses data that is associated with the transport service and stored in the databases 140 to determine a value or fare amount for that transport service. The fare determination operation can determine the value or score of the transport service based on a set of parameters associated with that transport service, such as the vehicle type, the price data associated with the vehicle type in that geographic region (e.g., current price per time and/or current price per distance for that region or associated with the pickup location), and/or the current price multiplier as compared to the default price data, as well as data associated with the transport service, such as the received location data and time data from the driver system 150. The fare determination operation can also deduct any credit balance or coupon/promotional value associated with the rider account or inputted by the rider in determining the value. The value or score can be a monetary amount or a value that corresponds to a monetary amount.

Depending on implementation, the fare determination operation can be the same operation as the fare calculation sub-operation of the default processing operation performed by the trip processing 130 or can be a different operation than the fare calculation sub-operation. For example, the fare determination operation can result in an estimated fare, as opposed to a more accurate fare resulting from the fare calculation sub-operation, and can use less data and computational resources of the system 100 than the fare calculation sub-operation. In the example of an estimated fare, the fare determination operation can use the location where the transport service started, the location where the transport service ended, and/or the overall duration of time to determine the estimated fare amount. On the other hand, the more accurate fare calculation operation or sub-operation can use the above-described information as well as more location data points of the transport service, such as data points periodically received during the progress of the transport service, which can indicate the route actually traveled by the driver in providing the transport service. Such a fare calculation operation can result in an actual, calculated fare.

By concurrently performing operations in parallel in response to receiving the "trip completed" message and because the fare determine 135 can initiate and complete the fare determination operation much faster than the trip processing 130 can initiate and complete the default processing operation, the system 100 can determine the fare information 199 for the transport service even before the default processing operation is completed for the transport service. As described herein, the fare information 199 can be an estimated fare or an actual, calculated fare, depending on examples. The timing check 118 can determine when the "trip completed" message is received by the system 100 (or when the "trip completed" message was transmitted by the driver system 150 and can determine whether completing the processing operation for that transport service has taken longer than a predetermined duration of time (e.g., ten seconds). In one example, the timing check 118 can include or communicate with a system clock or timer to make this determination. The predetermined duration of time can be configurable by an administrative user of the system 100.

If the timing check 118 determines that the predetermined duration of time has elapsed and that the processing operation has not completed and/or the predefined message 132 has not been transmitted, the timing check 118 can cause the system 100 to transmit the fare information 199 to the driver system 150. In such an example, the data determined from the fare determine 135 is transmitted to the driver system 150 before (or as opposed to transmitting) the predefined message 132. The application manage 160 can cause the UI component 175 to display content as part of a user interface 176 based on the fare information 199. The displayed content can include the fare amount for the transport service, so that the driver can show the rider the amount and receive the cash amount. In examples where the fare determination operation is different from the fare calculation operation, while the fare amount may be inaccurate, it may be close enough to what the actual fare amount would have been (e.g., within five to ten percent of the actual fare amount). In such examples, the entity that provides and implements the system 100 can compensate the driver for any shortage in fare amounts at a later time. In this manner, even though a necessary communication is delayed from the system 100 to the driver system 150, the driver system 150 can still receive fare information so that the cash-paying rider can pay the driver just after completion of the transport service, and the driver does not have to wait a substantial amount of time (e.g., wait two minutes for the driver system 150 to receive the predefined message 132, that includes the actual fare amount).

As an addition or an alternative, the driver system 150 can perform additional operations to mitigate any delays in receiving communications from the system 100. In one example, the application manage 160 can include a data polling component that periodically polls or pings the system 100 (e.g., at ten or fifteen second intervals) during the progress of the transport service for the fare information 199. Each time the system 100 receives the fare request, the fare determine 135 can determine the fare information 199 for the transport service as of the location and time the fare request is received (e.g., the location of the driver device and duration of the transport service up to that time), and transmit the information to the driver system 150. In this example, at each poll or ping request, the driver system 150 can receive and store, in a local memory, the received fare information 199, such that the most updated fare information 199 is stored. As the driver travels more distance and/or the time for the transport service increases, the fare amount for the transport service increases.

When the application manage 160 transmits a "trip completed" message to the system 100 when the driver indicates that the transport service has been completed, the timing check component of the application manage 160 can determine whether a predetermined duration of time (e.g., ten seconds) has passed since transmitting the "trip completed" message, during which a predefined message 132 has not been received by the driver system 150. If the timing check component determines that the predefined message 132 has been received before the predetermined duration of time has elapsed, the application manage 160 can use the data from the predefined message 132 to cause the UI component 175 to display content on the display of the driver device. In one example, the fare amount of the transport service, provided by information in the predefined message 132, can be displayed on the driver application. Alternatively, if the timing check component determines that the predetermined duration of time has elapsed, during which the predefined message 132 has not been received, the application manage 160 can cause the UI component 175 to display content using the most recently stored fare information 199 previously received from the system 100.

Still further, in another example, when the driver system 150 transmits, to the system 100, an acceptance message for the transport service or a message indicating that the transport service has started, the system 100 can transmit a set of fare instructions to the application manage 160, provided that the rider specified the payment profile 188 in the request 183 as a cash payment method. The set of fare instructions can include information to enable the application manage 160 to perform a fare determination operation independently of the system 100 (e.g., the price data associated with the vehicle type in that geographic region, the current price multiplier as compared to the default price data, any credit balance or coupon/promotional value associated with the rider). In such an example, when the timing check component of the application manage 160 determines that the "trip completed" message has been transmitted and then determines that the predefined message 132 has not been received during the predetermined duration of time, the timing check component can trigger the application manage 160 to use the set of fare instructions to determine the fare amount for the transport service. The application manage 160 can cause the UI component 175 to display the locally determined fare amount on the display of the driver device.

In such examples where the driver system 150 can perform alternative operations, the driver system 150 can mitigate problems with the system 100 providing the predefined message 132 in a timely fashion upon completion of the transport service (e.g., as a result of the queue 131, system downtime, network connectivity issues, etc.).

Methodology

Figure 2:
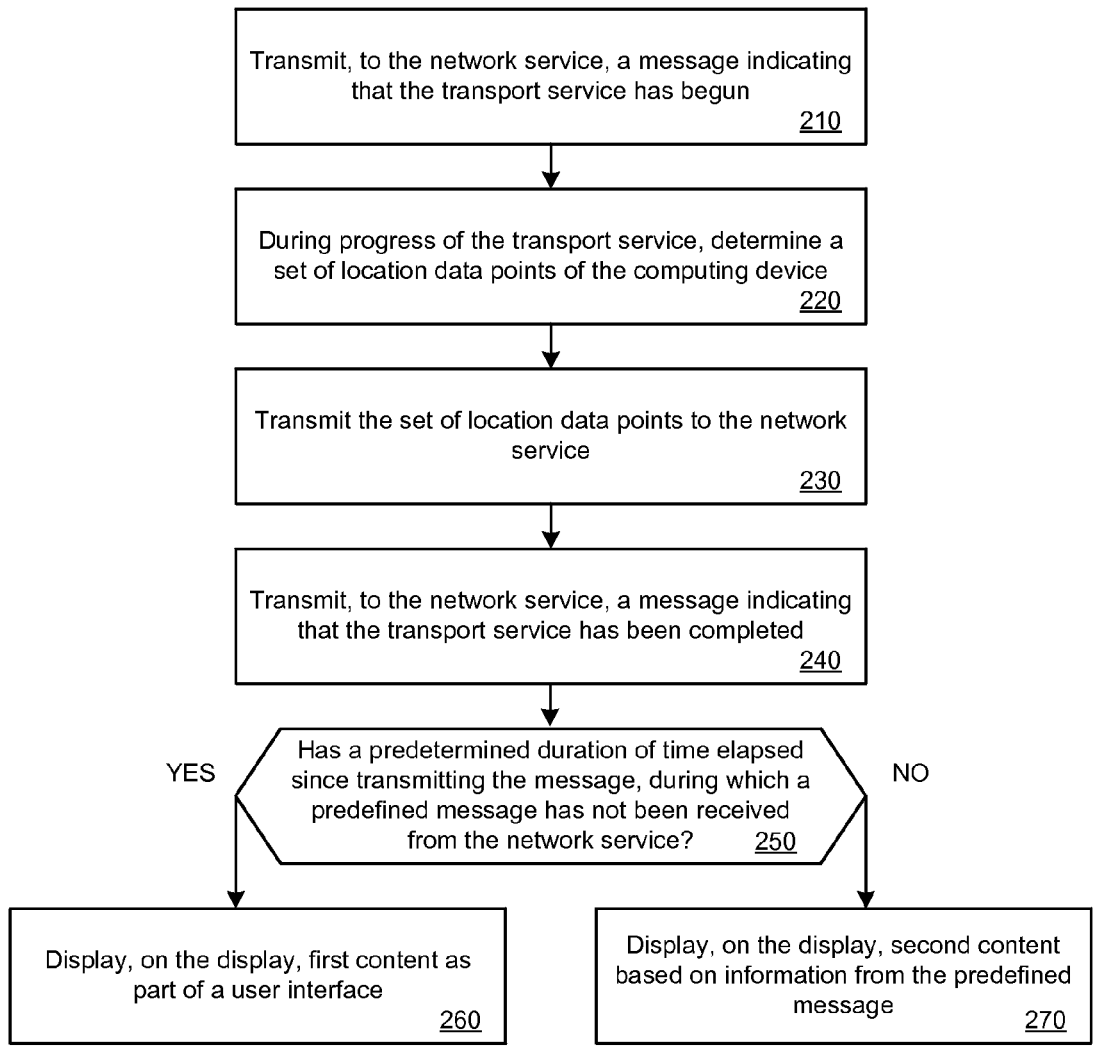
FIG. 2 illustrates an example method of displaying information in connection with a transport service based on a delay in communication between systems, according to an embodiment.
Figure 3A:
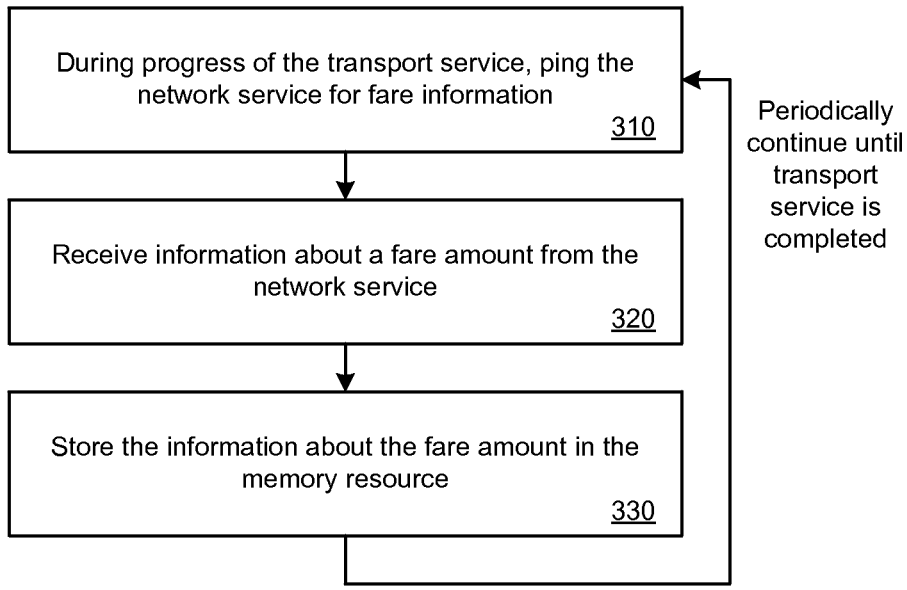
FIGS. 3A and 3B illustrate example methods of mitigating communicating delays between systems in connection with a transport service, under an embodiment.
Figure 3B:
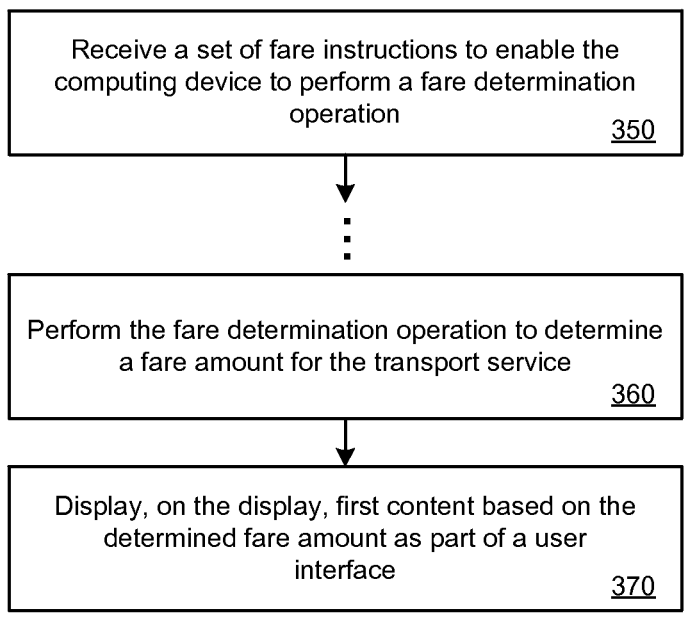
Figure 4:
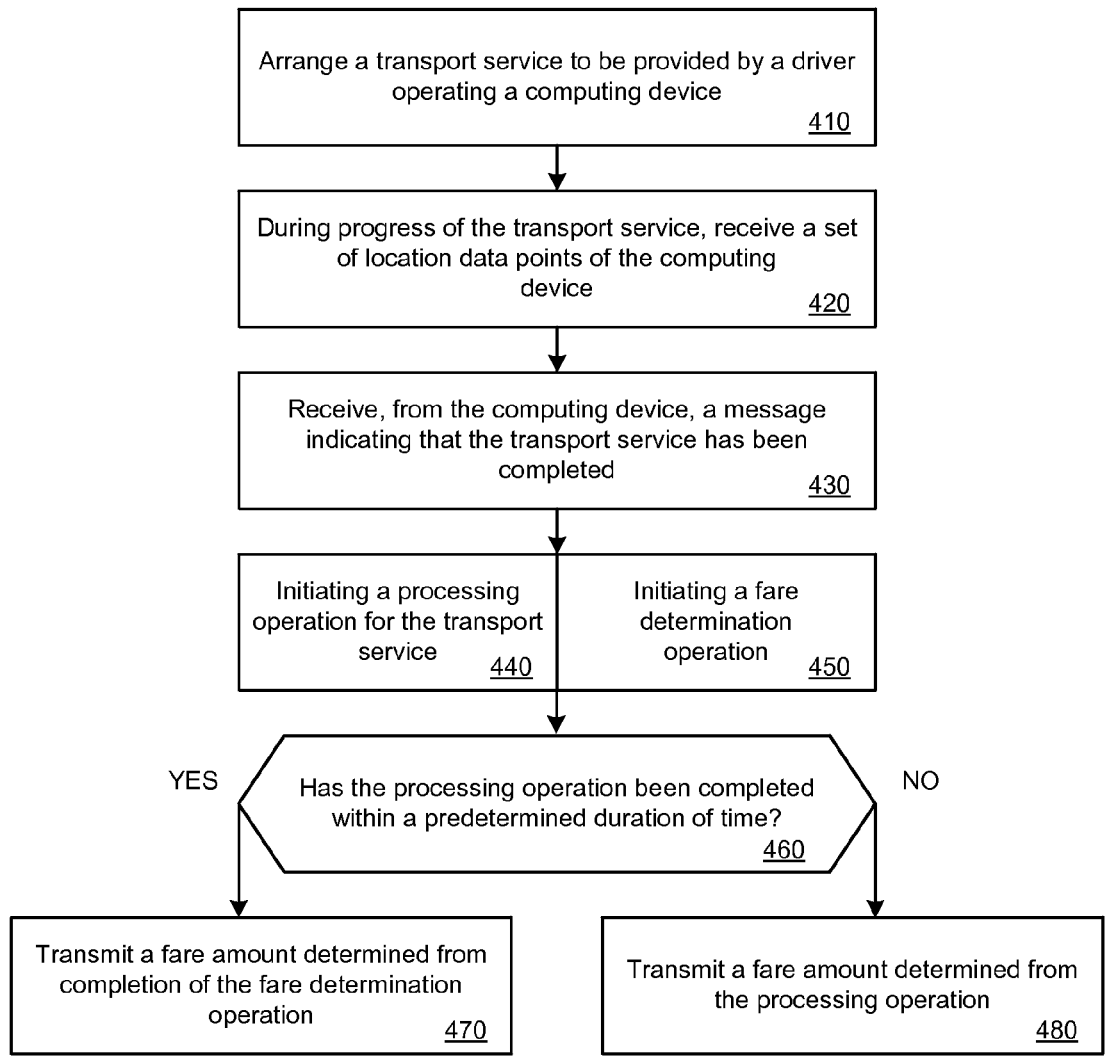
FIG. 4 illustrates an example method of providing information in connection with a transport service based on a delay in communication with between systems.

FIG. 2 illustrates an example method of displaying information in connection with a transport service based on a delay in communication between systems, according to an embodiment. FIGS. 3A and 3B illustrate example methods of mitigating communicating delays between systems in connection with a transport service, under an embodiment. FIG. 4 illustrates an example method of providing information in connection with a transport service based on a delay in communication with between systems. The methods such as described by examples of FIGS. 2 through 4 can be implemented using, for example, components described with the example of FIG. 1. Accordingly, references made to elements of FIG. 1 are for purposes of illustrating a suitable element or component for performing a step or sub-step being described.

In the example of FIG. 2, a driver operating a driver application or system, such as the driver system 150 of FIG. 1, may have been selected to provide a transport service for a requesting rider. The rider may have transmitted, via the rider device, a transport request that includes data indicating that the rider wishes to pay for the transport service using cash. The driver can travel to the pickup location of the rider and once the driver picks up the rider, the driver can provide input on the driver application to indicate that the transport service has begun. In response to the input, the driver system 150 can transmit, to the network service (or the system 100), a message indicating that the transport service has begun (210).

During progress of the transport service, e.g., as the driver travels to the destination requested by the rider, the driver system 150 can determine a set of location data points each corresponding to the current location of the driver device at an instance in time (220). The driver system 150 can transmit the set of location data points to the network service (230). When the driver arrives at the destination location, the driver can provide input on the driver application to indicate that the transport service has completed. In response to this input, the driver system 150 can transmit, to the network service, a message indicating that the transport service has completed (e.g., the "trip completed" message) (240).

Once the "trip completed" message is transmitted, the driver system 150 can determine whether a predetermined duration of time has elapsed since transmitting the message, during which a predefined message or communication has not been received from the network service (250). If, for example, the predetermined duration of time has elapsed and no predefined message is received, the driver system 150 can display, on the display of the driver device, first content as part of a user interface (260). For example, the first content can include or correspond to a fare amount for the transport service. In some examples, the first content can also include information indicating that the determined fare amount is an estimate as opposed to an accurate fare amount. Depending on implementation, the fare amount can be determined using different methods, such as described in FIG. 3A or 3B.

On the other hand, if the predefined message is received before the predetermined duration of time elapses, the driver system 150 can display, on the display of the driver device, second content (that is different from the first content) based on data from the predefined message (270). In this example, the network service has processed the completed transport service and/or has transmitted the predefined message in a timely fashion, such that the driver system 150 does not have to display content based on alternative operations performed, in advance, to mitigate any potential delays in communication.

The example methods described in FIGS. 3A and 3B can be performed in conjunction with the method described in FIG. 2. Referring to FIG. 3A, once the driver system 150 determines that the transport service has started (e.g., based on the driver's input), the driver system 150 can, during the progress of the transport service, ping or poll the network service for fare information (310). The network service can perform a fare determination operation for that transport service based on data associated with the transport service as of the time the network service is pinged or polled. The driver system 150 can receive information about the fare amount from the network service (320), and can store the information about the fare amount in a memory resource of the driver device (330). In some examples, the driver system 150 can transmit a fare request message periodically, such as every ten seconds, and can respectively periodically receive the information about the fare amount from the network service. As described in FIG. 3A, the driver system 150 can periodically repeat steps 310-330 until the transport service is completed (e.g., until the driver provides input indicating completion of the transport service).

With reference to FIGS. 2 and 3A, in one example, if the driver system 150 determines that the predetermined duration of time has elapsed and the predefined message has not been received from the network service, the driver system 150 can display the first content using the most recently stored information about the fare amount in the memory resource. In other words, the first content can include the fare amount that was the last determined fare amount for the transport service.

Alternatively, in another example, such as described in FIG. 3B, the driver system 150 can receive a set of fare instructions from the network service to enable the driver system 150 to perform a fare determination operation independent of the network service (350). Depending on implementation, the driver system 150 can receive the set of fare instructions at different times, such as in response to the driver accepting the transport service invitation or in response to the driver indicating that the transport service has begun. At a later time, such as when the driver system 150 determines that the predetermined duration of time has elapsed and the predefined message has not been received from the network service (e.g., step 250 of FIG. 2), the driver system 150 can be triggered to use the set of fare instructions to perform the fare determination operation in order to determine the fare amount for the transport service (360). The driver system 150 can display the first content based on this determined fare amount (370).

Referring to FIG. 4, a service arrangement system, such as the system 100 of FIG. 1, can arrange a service, such as a transport service, to be provided for a rider by a driver of a vehicle (410). As described herein, the system 100 can determine when the transport service has started based on data received from a driver device of the driver. During the progress of the transport service, the system 100 can receive a set of location data points from the driver device, where each location data point corresponds to a current location of the driver device at an instance in time (420). When the driver completes the transport service, the system 100 can receive, from the driver device, a message indicating that the transport service has been completed (430). In response to receiving the "trip completed" message, the system 100 can initiate, concurrently (and/or independently), a default or primary processing operation for the transport service (440) and a fare determination operation (450).

In some examples, the fare determination operation can be completed much faster than the processing operation for the transport service, which includes a plurality of sub-operations that need to be completed, including a fare calculation sub-operation. The system 100 can determine whether the processing operation has been completed within a predetermined duration of time (460). If the processing operation has not been completed within the predetermined duration of time, the system 100 can transmit fare information about the fare amount determined from the fare determination operation to the driver device (470). Alternatively, if the processing operation has completed within the predetermined duration of time, the system 100 can transmit the predefined message, which can include information about the fare amount determined from the fare calculation sub-operation (480). Among other benefits, in some examples, the system 100 can mitigate any delays in communication to the driver device by performing alternate operations in addition to the default operations.

Hardware Diagrams

Figure 5:
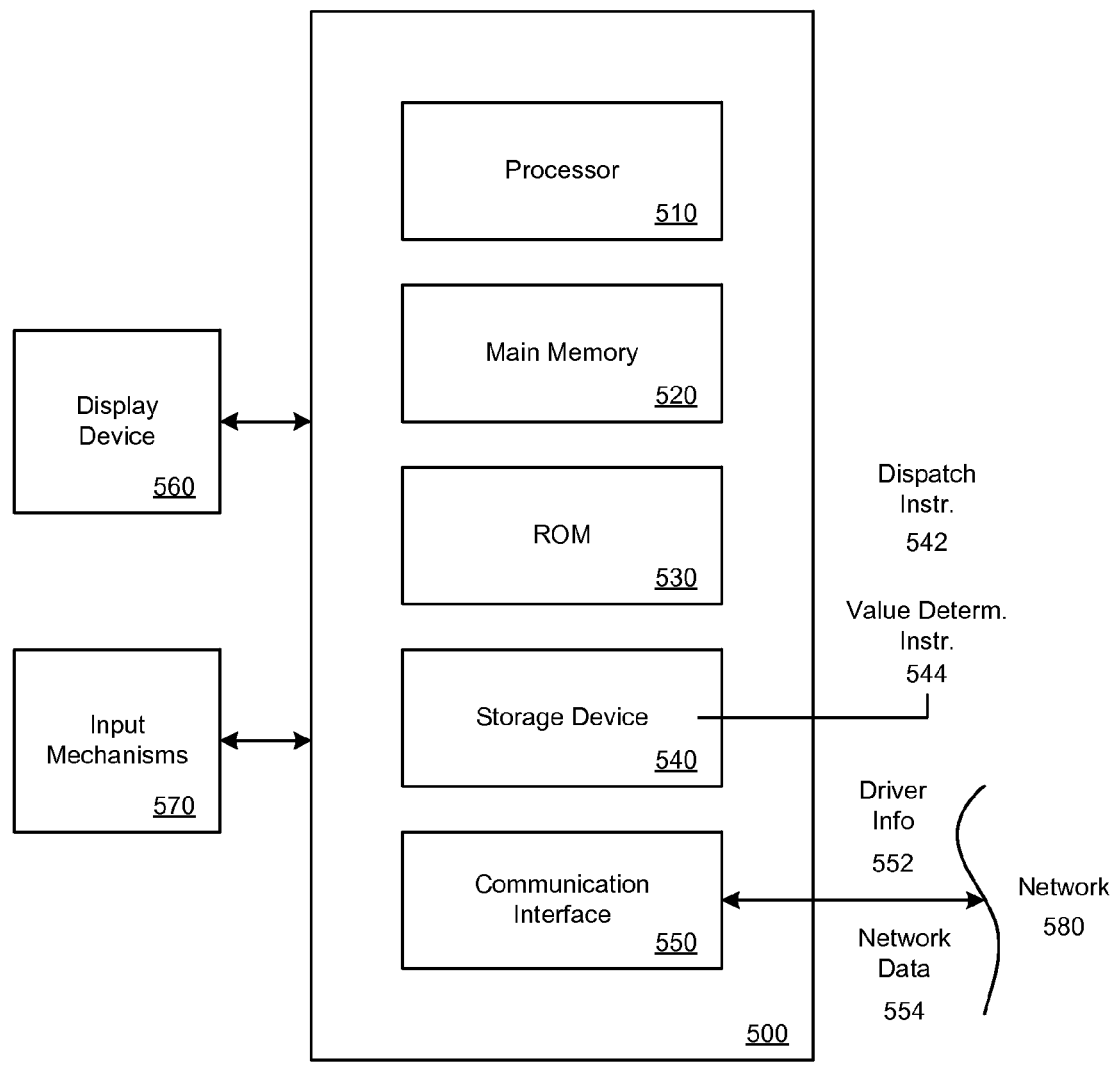
FIG. 5 is a block diagram that illustrates a computer system upon which embodiments described herein may be implemented.

FIG. 5 is a block diagram that illustrates a computer system upon which embodiments described herein may be implemented. For example, in the context of FIG. 1, the system 100 may be implemented using a computer system such as described by FIG. 5. The system 100 may also be implemented using a combination of multiple computer systems as described by FIG. 5.

In one implementation, a computer system 500 includes processing resources 510, a main memory 520, a read only memory (ROM) 530, a storage device 540, and a communication interface 550. The computer system 500 includes at least one processor 510 for processing information and the main memory 520, such as a random access memory (RAM) or other dynamic storage device, for storing information and instructions to be executed by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions, including dispatch instructions 542, value determine instructions 544, and other instructions, such as trip processing instructions. The storage device 540 can also store a plurality of databases and entries, such as described in FIG. 1.

For example, the processor 510 can execute the dispatch instructions 542 to implement logic for processing a request for transport service, determining the payment method of the requesting rider, selecting a driver to provide the transport service, and monitoring the progress of the transport service, such as described in FIGS. 1 through 4. The processor 510 can also execute the value determine instructions 544 to implement logic for determining a value or fare amount for a completed transport service, such as described in FIGS. 1 through 4.

The communication interface 550 can enable the computer system 500 to communicate with one or more networks 580 (e.g., cellular network) through use of the network link (wireless or wireline). Using the network link, the computer system 500 can communicate with one or more other computing devices, such as rider devices and driver devices, and/or one or more other servers or datacenters. In some variations, the computer system 500 can receive driver information 552 from the driver device via the network link. The driver information 552 can be received at various times in connection with a transport service, and can include the driver ID or device ID, the location data point of the driver, and/or a message indicating that a transport service has been accepted, has started, or has completed. The processor 510, through execution of instructions, can transmit network service data 554 (e.g., a predefined message or fare information) based on whether the processing operation for the transport service has completed within a predetermined duration of time since receiving, for example, a message indicating that the transport service has been completed, such as described in FIGS. 1 through 4.

The computer system 500 can also include a display device 560, such as a cathode ray tube (CRT), an LCD monitor, or a television set, for example, for displaying graphics and information to a user. One or more input mechanisms 570, such as a keyboard that includes alphanumeric keys and other keys, can be coupled to the computer system 500 for communicating information and command selections to the processor 510. Other non-limiting, illustrative examples of input mechanisms 570 include a mouse, a trackball, touch-sensitive screen, or cursor direction keys for communicating direction information and command selections to the processor 510 and for controlling cursor movement on the display 560.

Examples described herein are related to the use of the computer system 500 for implementing the techniques described herein. According to one embodiment, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
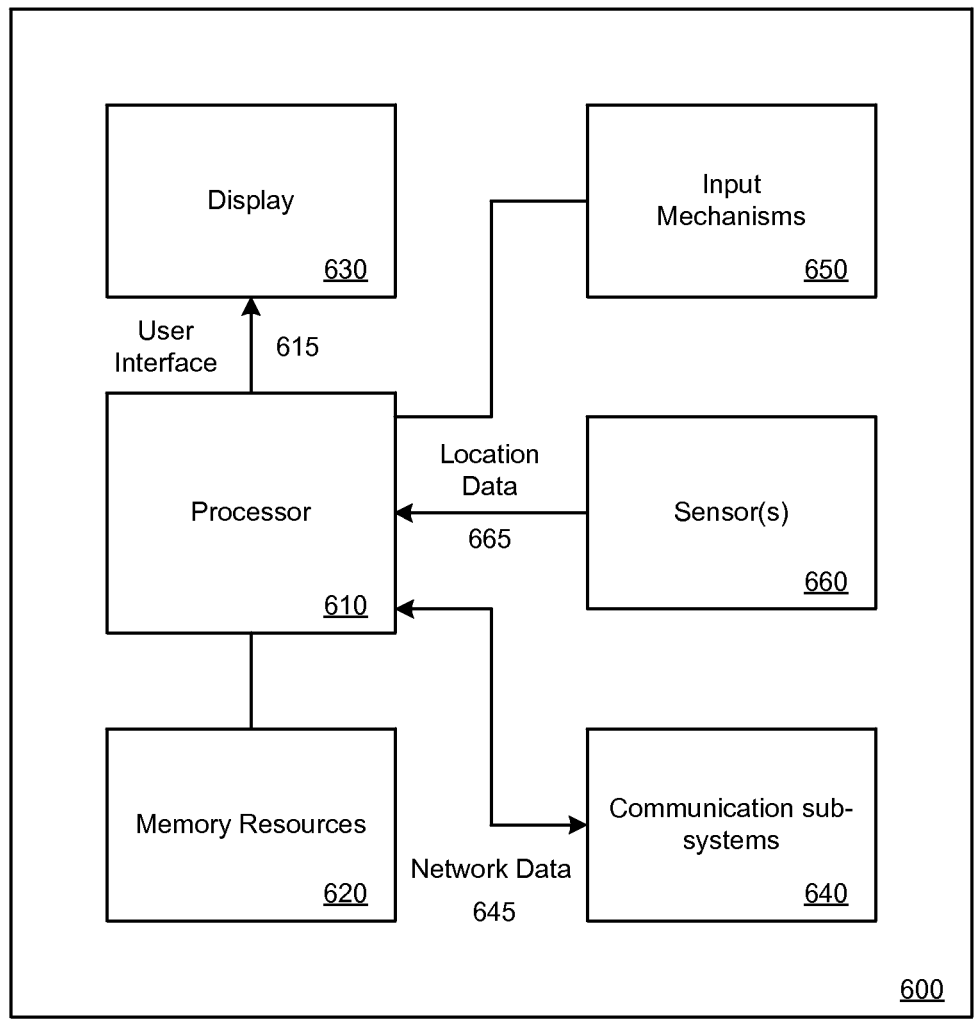
FIG. 6 is a block diagram that illustrates a mobile computing device upon which embodiments described herein may be implemented.

FIG. 6 is a block diagram that illustrates a mobile computing device upon which embodiments described herein may be implemented. In one embodiment, a computing device 600 may correspond to a mobile computing device, such as a cellular device that is capable of telephony, messaging, and data services. The computing device 600 can correspond to a rider device or a driver device. Examples of such devices include smartphones, handsets or tablet devices for cellular carriers. The computing device 600 includes a processor 610, memory resources 620, a display device 630 (e.g., such as a touch-sensitive display device), one or more communication sub-systems 640 (including wireless communication sub-systems), input mechanisms 650 (e.g., an input mechanism can include or be part of the touch-sensitive display device), one or more sensors 660, including a location detection mechanisms (e.g., GPS receiver), and a camera (not shown in FIG. 6). In one example, at least one of the communication sub-systems 640 sends and receives cellular data over data channels and voice channels.

The processor 610 can provide a variety of content to the display 630 by executing instructions and/or applications that are stored in the memory resources 620. For example, the processor 610 is configured with software and/or other logic to perform one or more processes, steps, and other functions described with implementations, such as described by FIGS. 1 through 5, and elsewhere in the application. In particular, in one example, the processor 610 can execute instructions and data stored in the memory resources 620 in order to operate a driver application, as described in FIGS. 1 through 5. Still further, the processor 610 can cause one or more user interfaces 615 to be displayed on the display 630, such as one or more user interfaces provided by the driver application. Input can be provided on the driver application through a combination of the input mechanisms 650 and the display 630, for example, such as through use of a touch-sensitive display device.

A driver can operate the computing device 600 to operate the driver application in order to receive an invitation for a transport service. The driver application can also communicate with the sensor(s) to determine location data 665 corresponding to the current location of the computing device 600. For example, the computing device 600 can periodically determine a location data point 665 of the current location and provide the location data point 665 to the service arrangement system (not shown in FIG. 6). The service arrangement system can provide communications to the computing system 600 via the communication sub-systems 640. The computing device 600 can also transmit messages to the service arrangement system via the communication sub-systems 640, including a "trip completed" message. In one example, based on a determination whether the computing device 600 has received a predefined message from the service arrangement system in a timely manner (e.g., within fifteen seconds of transmitting the "trip completed" message), the driver service application can either display, as part of a user interface 615, network service data 645 received from the service arrangement system or other data previously stored in the memory resources 620. While FIG. 6 is illustrated for a mobile computing device, one or more examples may be implemented on other types of devices, including full-functional computers, such as laptops and desktops (e.g., PC).

It is contemplated for examples described herein to extend to individual elements and concepts described herein, independently of other concepts, ideas or system, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude having rights to such combinations.

What is being claimed is:

1. A method of displaying information on a computing device of a driver in connection with the driver providing a transport service, the method being performed by one or more processors of the computing device and comprising:
running an application on the computing device using computing resources and memory resources of the computing device, the application being in communication with a network service over one or more networks;
during progress of the transport service, (i) determining a set of location data points using a global positioning system (GPS) receiver of the computing device, each of the set of location data points corresponding to a current location of the computing device at an instance in time, (ii) transmitting, to the network service, the set of location data points, and (iii) receiving data from the network service to enable independent determination of a value that estimates a monetary amount for the transport service as determined by the network service, the value reflecting at least one of a distance or time of travel for the transport service;
transmitting, to the network service, a message indicating that the transport service has been completed;
initiating a timer for a predetermined duration of time based on the transmitted message;
determining that (i) the predetermined duration of time has elapsed since transmitting the message indicating that the transport service has been completed, and (ii) during the predetermined duration of time, a predefined message has not been received by the application from the network service, the predefined message being associated with a confirmation that the transport service has been processed by the network service; and
after the predetermined duration of time has elapsed, triggering the computing device to display content that identifies the estimated value for the transport service on a display of the computing device, the estimated value being determined by the computing device using the data received from the network service.

2. The method of claim 1, further comprising:
transmitting, to the network service, a message indicating that the transport service has begun in response to receiving a first user input on the application running on the computing device; and
wherein transmitting the message indicating that the transport service has been completed is performed in response to receiving a second user input on the application running on the computing device.

3. The method of claim 1, wherein receiving data from the network service to enable independent determination of the value includes
receiving information for estimating the monetary amount from the network service, and storing the information in the memory resources.

4. The method of claim 3, wherein triggering the computing device includes:
retrieving, from the memory resources, information about the monetary amount that is most recently received from the network service.

5. The method of claim 1, further comprising:
receiving, from the network service, an invitation message to provide a transport service for a requesting user;
displaying, on the display, an invitation user interface based on the invitation message;
transmitting, to the network service, an acceptance message in response to receiving a first user input on the application running on the computing device; and
wherein receiving data from the network service to enable independent determination of the value includes—receiving, from the network service, a set of instructions and price information for the transport service, the set of instructions enabling determination of the value based at least in part on the price information.

6. The method of claim 5, wherein the set of instructions are received in response to transmitting the acceptance message.

7. A non-transitory computer-readable medium storing instructions that, when executed by one or more processors of a computing device, cause the computing device to:
run an application on the computing device, the application being in communication with a network service over one or more networks;
during progress of a transport service, (i) determine a set of location data points using a global positioning system (GPS) receiver of the computing device, each of the set of location data points corresponding to a current location of the computing device at an instance in time, (ii) transmit, to the network service, the set of location data points, and (iii) receive data from the network service to enable independent determination of a value that estimates a monetary amount for the transport service as determined by the network service, the value reflecting at least one of a distance or time of travel for the transport service;
transmit, to the network service, a message indicating that the transport service has been completed;
initiating a timer for a predetermined duration of time based on the transmitted message;
determine whether the predetermined duration of time has elapsed since transmitting the message indicating that the transport service has been completed, during which a predefined message has not been received by the application from the network service, the predefined message being associated with a confirmation that the transport service has been processed by the network service;
if the predetermined duration of time has elapsed since transmitting the message indicating that the transport service has been completed, during which the predefined message has not been received by the application, trigger the computing device to display a first content that identifies the estimated value for the transport service on a display of the computing device, the estimated value being determined by the computing device using the data received from the network service; and
else if the predefined message is received by the application before the predetermined duration of time has elapsed since transmitting the message indicating that the transport service has been completed, display, on the display, a second content based on information from the predefined message.

8. The non-transitory computer-readable medium of claim 7, wherein the instructions further cause the computing device to:
transmit, to the network service, a message indicating that the transport service has begun in response to receiving a first user input on the application running on the computing device; and
wherein the instructions cause the computing device to transmit the message indicating that the transport service has been completed is performed in response to receiving a second user input on the application running on the computing device.

9. The non-transitory computer-readable medium of claim 7, wherein the computing device receives data over the one or more networks that includes information about the monetary amount from the network service, and (iii) store the information about the monetary amount in the non-transitory computer-readable medium or another memory resource accessible by the one or more processors.

10. The non-transitory computer-readable medium of claim 9, wherein the instructions further cause the computing device to:
if the predetermined duration of time has elapsed, retrieve information about the monetary amount that is most recently received from the network service.

11. The non-transitory computer-readable medium of claim 7, wherein the instructions further cause the computing device to:
receive, from the network service, an invitation message to provide a transport service for a requesting user;
display, on the display, an invitation user interface based on the invitation message;
transmit, to the network service, an acceptance message in response to receiving a first user input on the application running on the computing device; and
wherein the data that the computing device receives includes price information.

12. The non-transitory computer-readable medium of claim 11, wherein the data is received in response to transmitting the acceptance message.

* * * * *